United States Patent
Annamaneni et al.

(10) Patent No.: US 10,341,183 B2
(45) Date of Patent: Jul. 2, 2019

(54) COMPOSITE NAVIGATION METHOD AND SYSTEM FOR AUTOMATIC CONFIGURATION MANAGEMENT OF APPLICATION SOFTWARE

(71) Applicant: Conduent Business Services LLC, Dallas, TX (US)

(72) Inventors: Narendra Annamaneni, Ananthapur (IN); Sriganesh Madhvanath, Pittsford, NY (US); Luke Tratnik, Toronto (CA); Thomas Olszewicki, Markham (CA); Wieslaw Marian Suchy, Etobicoke (CA)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 271 days.

(21) Appl. No.: 15/381,141

(22) Filed: Dec. 16, 2016

(65) Prior Publication Data
US 2018/0176083 A1 Jun. 21, 2018

(51) Int. Cl.
H04L 12/24 (2006.01)
H04L 29/08 (2006.01)
G06F 9/445 (2018.01)

(52) U.S. Cl.
CPC ...... *H04L 41/0853* (2013.01); *G06F 9/44505* (2013.01); *H04L 41/0806* (2013.01); *H04L 41/0886* (2013.01); *H04L 67/34* (2013.01)

(58) Field of Classification Search
CPC ............. G06F 11/368; G06F 17/30864; G06F 17/30994; G06F 9/44505; H04L 41/0806;
(Continued)

(56) References Cited

U.S. PATENT DOCUMENTS 8,819,856 B1 * 8/2014 Tiffe .................... G06F 21/125
726/31
2008/0178147 A1 7/2008 Meliksetian et al.
(Continued)

OTHER PUBLICATIONS

Lui et al.,An AST-based approach to classifying defects, 2015 , IEEE Conference on Software Quality; Reliability and Security.*
(Continued)

*Primary Examiner* — Chirag R Patel
(74) *Attorney, Agent, or Firm* — Jones Robb, PLLC

(57) ABSTRACT

The disclosed embodiments illustrate a composite navigational method and system for the automatic configuration management of application software by a computing server. The method includes extracting a plurality of previous configuration values from a storage device. The method further includes generating a plurality of abstract syntax trees (ASTs) based on parsing of the plurality of previous configuration values. The method further includes performing one or more pre-specified operations on the generated plurality of ASTs. The method further includes determining a configuration value of a current configuration parameter based on a navigation pattern, such as hierarchical navigation or variable-based filtering navigation. Further, the navigation pattern is determined using the performed one or more pre-specified operations, based on at least user preferences and the extracted plurality of previous configuration values. The method further comprising controlling the configuration of the application software based on the determined configuration value of the current configuration parameter.

19 Claims, 7 Drawing Sheets

(58) Field of Classification Search
CPC .. H04L 41/0853; H04L 41/0886; H04L 67/34
See application file for complete search history.

(56) References Cited

U.S. PATENT DOCUMENTS

2012/0084609 A1* 4/2012 Tkachuk ............ G06F 11/3688
   714/48
2012/0254845 A1* 10/2012 Yi ............................ G06F 8/45
   717/144

OTHER PUBLICATIONS

Brendan J. Frey and Delbert Dueck, "Clustering by Passing Messages Between Data Points", Science Feb. 2007.
Zechner, Mario, et al. "External and intrinsic plagiarism detection using vector space models." *Proc. SEPLN.* vol. 32, 2009.
Jiang, Lingxiao, et al. "Deckard: Scalable and accurate tree-based detection of code clones." *Proceedings of the 29th international conference on Software Engineering.* IEEE Computer Society, 2007.
Kaizhong Zhang and Dennis Shasha. Simple fast algorithms for the editing distance between trees and related problems. SIAM Journal on Computing, 18(6):1245-1262, 1989.

* cited by examiner

COMPOSITE NAVIGATION METHOD AND SYSTEM FOR AUTOMATIC CONFIGURATION MANAGEMENT OF APPLICATION SOFTWARE

TECHNICAL FIELD

The presently disclosed embodiments are related, in general, to software management. More particularly, the presently disclosed embodiments are related to a composite navigation method and system for the automatic configuration management of application software.

BACKGROUND

Typically, configurable-off-the-shelf (COTS) software refers to application software written for a variety of industries or users in a manner that permits the users to modify the program to meet individual requirements. The use of COTS software can reduce development effort by software developers and increase the timely development and delivery of products and services across various domains, such as engineering, medical, finance, travel, and so on.

Generally, simple forms of modification in COTS software may be addressed using configuration parameters with numeric or string typed values. However, in case a significant change is desired in the system, complex configuration values that are pieces of logic encapsulated in form of pseudo-code or high-level programming language may be utilized. Such complex configuration values offer unmatched flexibility to support a wide variety of customers with different requirements.

However, the use of complex configuration values that are pieces of logic makes it difficult for domain experts who are not programmers to configure the system for a given set of requirements. To the extent that different instantiations of the COTS software require identical or similar behavior, it becomes highly desirable to reuse configuration settings from previous configurations (e.g., those developed for similar customers in the past, or even for the same customer previously). Such reuse promises lower cost, faster turn-around, better quality, decrease in risk, simplified maintenance, and the potential for less stressful development and delivery processes.

However, while the reuse of configuration settings from previous configurations is highly desirable, it becomes difficult for even programmers to understand the behavior implemented by, and the relationship between, the different pieces of logic encapsulated in the various past configurations of application software. This problem is deepened by lack of COTS-specific software reuse models.

The above listed problems create several undesirable consequences, such as increase in cost due to involvement of expert programmers, high risk of loss in translation between domain experts who understand customers' requirements and programmers who must translate that into logic. Another consequence is the increased likelihood that programmers will use shortcuts to achieve the behavior needed, rather than reuse previously implemented configuration settings for a given parameter for the same or other customers, as it is often easier to write it from scratch. Over a period of time, these configuration values become opaque and very difficult to update, for example, in response to a change in legislation or customer requirements.

Further limitations and disadvantages of conventional and traditional approaches will become apparent to a person having ordinary skill in the art, through a comparison of described systems with some aspects of the present disclosure, as set forth in the remainder of the present application and with reference to the drawings.

SUMMARY

According to embodiments illustrated herein, there may be provided a composite navigational method for automatic configuration management of application software by a computing server. The composite navigational method includes extracting, by a data extraction processor at the computing server, a plurality of previous configuration values corresponding to a plurality of configuration parameters, derived from a plurality of previous system configurations from a storage device. A configuration value in the plurality of extracted previous configuration values may correspond to a logic fragment of the application software at a user-computing device. The user-computing device may be communicatively coupled to the computing server over a communication network. The method further includes generating, by a tree generating processor at the computing server, a plurality of abstract syntax trees (ASTs) based on parsing of the plurality of previous configuration values. The method further includes performing, by a processor at the computing server, one or more pre-specified operations on the generated plurality of ASTs. The method further includes determining, by the processor, a configuration value of a current configuration parameter based on a navigation pattern. The navigation pattern may be determined using the performed one or more pre-specified operations based on at least user preferences and the extracted plurality of previous configuration values. The method further includes controlling, by the processor, configuration of the application software at the user-computing device over the communication network, based on the determined configuration value of the current configuration parameter.

According to embodiments illustrated herein, there may be provided a composite navigational system for automatic configuration management of application software. The system includes a data extraction processor that may be configured to extract a plurality of previous configuration values corresponding to a plurality of configuration parameters, derived from a plurality of previous system configurations from a storage device. A configuration value in the plurality of extracted previous configuration values may correspond to a logic fragment of the application software at a user-computing device. The user-computing device may be communicatively coupled to the computing server over a communication network. The system further includes a tree generating processor that may be configured to generate a plurality of abstract syntax trees (ASTs) based on parsing of the plurality of previous configuration values. The system further includes a processor that may be configured to perform one or more pre-specified operations on the generated plurality of ASTs. The processor may be further configured to determine a configuration value of a current configuration parameter based on a navigation pattern. The navigation pattern may be determined using the performed one or more pre-specified operations based on at least user preferences and the extracted plurality of previous configuration values. The processor may be further configured to control the configuration of the application software at the user-computing device, based on the determined configuration value of the current configuration parameter.

According to embodiments illustrated herein, there may be provided a computer program product for use with a computing device. The computer program product comprises a non-transitory computer readable medium storing a computer program code for automatic configuration management of application software by a computing server. The computer program code is executable by one or more processors in the computing server to extract a plurality of previous configuration values corresponding to a plurality of configuration parameters, derived from a plurality of previous system configurations from a storage device. A configuration value in the plurality of extracted previous configuration values may correspond to a logic fragment of the application software at a user-computing device. The user-computing device may be communicatively coupled to the computing server over a communication network. The computer program code is further executable by the one or more processors to generate a plurality of abstract syntax trees (ASTs) based on parsing of the plurality of previous configuration values. The computer program code is further executable by the one or more processors to perform the one or more pre-specified operations on the generated plurality of ASTs. The computer program code is further executable by the one or more processors to determine a configuration value of a current configuration parameter based on a navigation pattern. The navigation pattern may be determined using the performed one or more pre-specified operations based on at least user preferences and the extracted plurality of previous configuration values. The computer program code is further executable by the one or more processors to control configuration of the application software at the user-computing device over the communication network, based on the determined configuration value of the current configuration parameter.

BRIEF DESCRIPTION OF DRAWINGS

The accompanying drawings illustrate the various embodiments of systems, methods, and other aspects of the disclosure. A person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
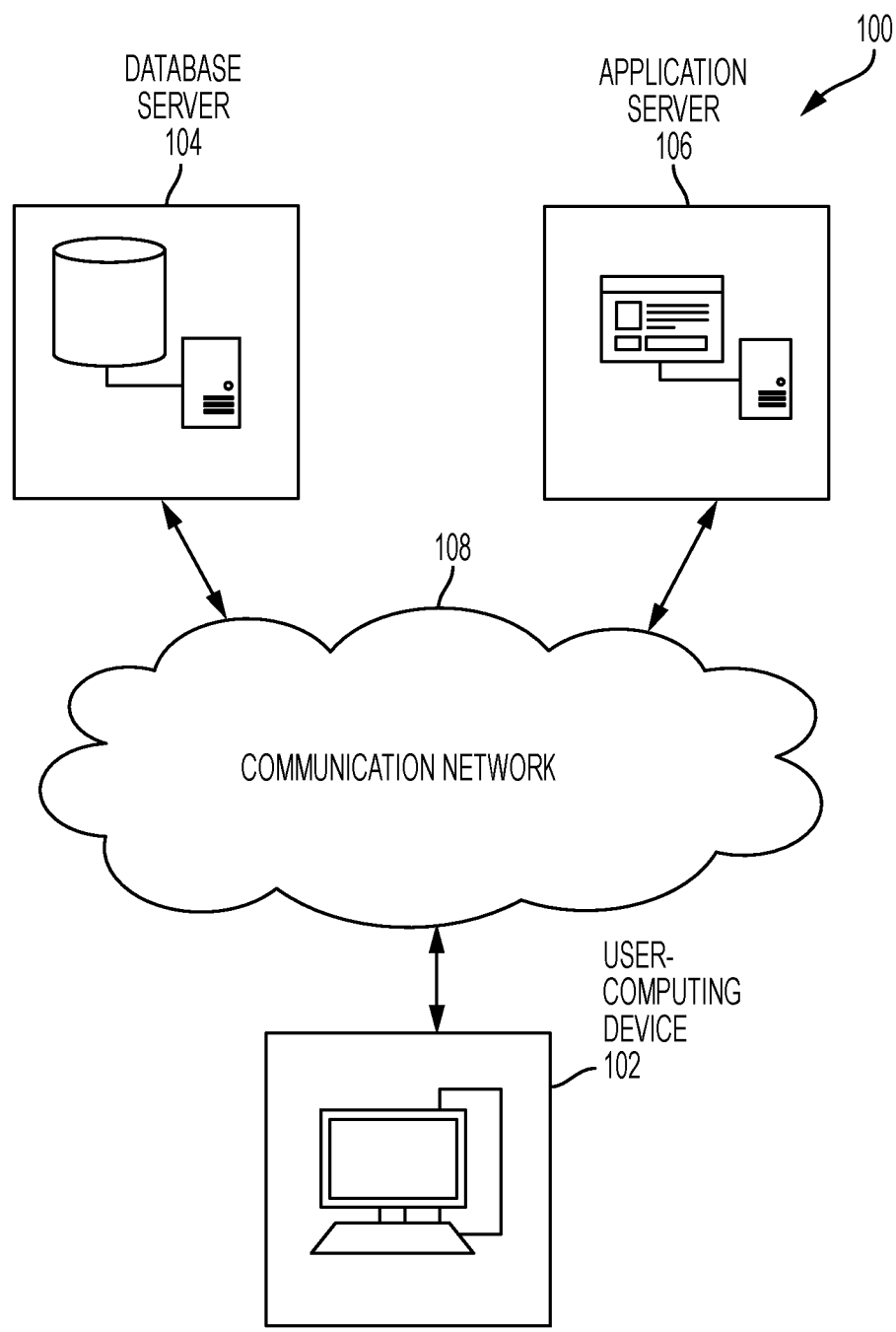
FIG. 1 is a block diagram that illustrates a system environment in which various embodiments of the disclosed composite navigation method and system can be implemented, in accordance with at least one embodiment.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes, as the method and system may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

The following terms shall have, for the purposes of this application, the respective meanings set forth below.

A "user-computing device" refers to a computer, a device (that includes one or more processors/microcontrollers and/or any other electronic components), or a system (that performs one or more operations according to one or more sets of programming instructions, codes, or algorithms) associated with a user. In an embodiment, the user may utilize the user-computing device to input a request for the automatic configuration management of application software. The user-computing device may transmit the received request to a computing server over a communication network. In another embodiment, the user may utilize the user-computing device to provide the preferences that may be utilized by the computing server to determine a navigation pattern. Examples of the user-computing device may include, but are not limited to, a desktop computer, a laptop, a personal digital assistant (PDA), a mobile device, a smart phone, and a tablet computer (e.g., iPad® and Samsung Galaxy Tab®).

"Application software" refers to a computer program, instruction, algorithm, or code that may be designed to perform a group of coordinated tasks or functions. For example, the application software may correspond to COTS software that is written (coded or programmed) for a variety of applications for a variety of industries or users. In an embodiment, the application software may be modified in a manner that may permit or allow the users to meet their individual needs.

A "configuration parameter" may refer to a feature or element of application software that is required to be configured before executing the application software for an application. In an embodiment, the configuration parameter may represent a setting that may control execution of the application software. The configuration parameter may be used to enable, disable, tune, or specify the exact behavior of different aspects of the application software, such as the user interface, computation, or how external data is ingested. For example, a configuration parameter of software used to support pension plans may be "Benefit Computation." In an embodiment, the configuration parameters may be associated with default values that are stored in a storage unit. In another embodiment, the values of the configuration parameters may be computed in real-time or non-real time based on defined instructions and the application.

A "current configuration parameter" may refer to a configuration parameter that is in the process of being configured by the user for new instantiation of the application software.

A "configuration value" may refer to the value of a configuration parameter that may be essential for specifying the precise execution behavior of the application software. The configuration value may be a simple data type such as a number or string literal, or as complex as a piece of logic.

A "previous configuration value" may refer to a configuration value (e.g., a logic fragment) that represents a previous setting of a configuration parameter of the application software that may have been used for previous instantiation of the software. The previous setting may have been previously used to enable, disable, or tune features, of specify behavior of the application software.

A "current configuration value" may refer to a configuration value that a current configuration parameter may be set to in order to specify desired application behavior. In a scenario where the current configuration value for the current configuration parameter is yet to be determined, the configuration value may be determined using a computing server. For example, the computing server may use one or more navigation mechanisms to determine the configuration value. The one or more navigation mechanisms may correspond to a hierarchical navigation, a variable-based filtering navigation, and/or the like. Such one or more navigation mechanisms may make it easier for both non-programmers and programmers to navigate a set of configuration values for a given configuration parameter.

A "variable" may refer to an element in a logic fragment (i.e., a configuration value) that does not have a constant value; rather it refers to an attribute of an entity in the application domain. For example, a particular configuration value for the "Benefit Computation" parameter may refer to the age of the user, a different value may refer to the number of years of service of the user. Such variables are useful in order to select a subset of values of interest. In an embodiment, the subset of values may be filtered from a set of previous configuration values based on the preferences of the user.

"Parsing" may refer to the process of analyzing a string of symbols, either in natural languages or computer languages, based on defined rules. For example, a configuration value associated with a configuration parameter may be parsed to generate an AST, using a parser for a specific language. Language-specific parsers may be generated using a parser generator tool, for example, Another Tool for Language Recognition (ANTLR) parser tool.

An "AST" may refer to the tree representation of the abstract syntactic structure of a fragment of logic corresponding to a configuration value obtained by parsing the symbols therein. A plurality of ASTs may be generated from a plurality of previous configuration values.

"One or more pre-specified operations" may refer to one or more operations or processes that may be performed on a plurality of ASTs to determine a navigation pattern. The one or more operations may be performed based on at least user preferences and a plurality of previous configuration values of a plurality of system configuration parameters. In an embodiment, the one or more pre-specified operations may correspond to, but are not limited to, a distance computation operation, a variable extraction operation, and a feature extraction operation.

"Navigation pattern" may refer to a series of steps or instructions that may be executed in a sequence to determine the current configuration value of a current configuration parameter. The series of steps or instructions may be executed by the computing server, based on a plurality of previous configuration values corresponding to a current configuration parameter, as well as the configured values of other configuration parameters of the software. In an embodiment, the series of steps or instructions of the navigation pattern may be associated with one or more pre-specified operations. In an embodiment, the navigation pattern may correspond to hierarchical navigation or variable-based filtering navigation. For example, the hierarchical navigation of logic fragments in a set of potential values ("$V_i$") for a given configuration parameter may be realized or executed using unsupervised machine learning methods. The variable-based filtering navigation of logic fragments in the set of potential values ("$V_i$") may be realized or executed based on key variables extracted from the logic fragments.

"Data structure" may refer to the grouping of data that is represented in a particular format for storage or further processing. In an embodiment, the data structure may be generated based on the computation of one or more tree distances between one or more pairs of ASTs.

A "tree edit distance measure" may refer to the measure of a number of changes with respect to one or more nodes in an AST that is required to convert the AST into another AST. The number of changes can be determined based on an insert operation, a delete operation, or a modify operation. For example, the replacement of a node "v" in the AST "T1" with a different node may correspond to a modify operation, deleting a child node "v" in the AST "T1" with a parent node "V" may correspond to a delete operation, inserting a node "v" as a child of the parent node "V" in the AST "T1" may correspond to an insert operation.

A "cluster" may refer to a collection or a group of one or more ASTs corresponding to different known configuration values. Known techniques to cluster the one or more values may include, but are not limited to, an affinity-based clustering technique, a k-means clustering technique, an agglomerative hierarchical clustering technique, and a standard clustering algorithm.

A "short name" may refer to a set of characters that is used to represent the name of a configuration value of a configuration parameter. The short name may be displayed on a user interface rendered on a computing device associated with a user. In an embodiment, the short name for a configuration value may be determined based on the frequency of occurrence of each of a plurality of variables in the AST corresponding to the value. For example, the plurality of variables may be sorted based on the frequency of their occurrence in the AST. The most commonly occurring k (where k=2, 3, . . . , n) variables (with their corresponding values if present) may be merged to form the short name corresponding to the configuration value.

FIG. 1 is a block diagram of a system environment in which various embodiments of a composite navigational method and system for the automatic configuration management of application software may be implemented, in accordance with at least one embodiment. With reference to FIG. 1, there is shown a system environment 100 that includes a user-computing device 102, a database server 104, an application server 106, and a communication network 108. Various devices in the system environment 100 may be interconnected over the communication network 108. FIG. 1 shows, for simplicity, one user-computing device, such as the user-computing device 102, one database server, such as the database server 104, and one application server, such as the application server 106. However, it will be apparent to a person having ordinary skill in the art that the disclosed embodiments may also be implemented using multiple user-computing devices, multiple database servers, and multiple application servers without departing from the scope of the disclosure.

The user-computing device 102 may refer to a computing device (associated with a user) that may be communicatively coupled to other devices over the communication network 108. A user, such as an employee (e.g., a software programmer or an information technology professional) associated with an organization, may utilize the user-computing device 102 to input a request for the automatic configuration management of application software for an application. The user may further utilize the user-computing device 102 to provide one or more user preferences that may be transmitted to the application server 106 by the user-computing device 102 over the communication network 108. For example, a user preference may correspond to a choice of the user for an application software for executing an application on the user-computing device 102. The user preference may further correspond to a choice of the user for one or more configuration parameters that are essential for executing the application using the application software. The user preference may further correspond to a choice of the user for a navigation pattern for the automatic configuration management of the application software.

The user-computing device 102 may include one or more processors in communication with one or more memory units. Further, in an embodiment, the one or more processors may be operable to execute one or more sets of computer-readable code, instructions, programs, or algorithms that are stored in the one or more memory units to perform one or more operations.

The user-computing device 102 may further include a display screen that may be configured to display a head member of each cluster at one or more graphical user interfaces (GUIs) rendered by the application server 106 over the communication network 108. For example, the application server 106 may render a GUI displaying the head member of each cluster and enabling the user to view all the members of the cluster by selecting the displayed head member. In an embodiment, the display screen of the user-computing device 102 may be further configured to display a short name of the configuration value.

Examples of the user-computing device 102 may include, but are not limited to, a personal computer, a laptop, a PDA, a mobile device, a tablet, or other such computing devices.

The database server 104 may refer to a computing device or a storage device that may be communicatively coupled to the communication network 108. In an embodiment, the database server 104 may be configured to perform one or more database operations. Examples of the one or more database operations may include receiving/transmitting one or more queries, requests, or user preferences from/to one or more computing devices, such as the user-computing device 102, or one or more computing servers, such as the application server 106. The one or more database operations may further include processing and storing the one or more queries, requests, or user preferences.

Further, in an embodiment, the database server 104 may be configured to store a plurality of previous configuration values corresponding to a plurality of configuration parameters. The plurality of configuration parameters may be associated with the application software that may have been used for a previous application. In an embodiment, the database server 104 may be further configured to store a set of configuration values corresponding to a current configuration parameter. The current configuration parameter may be associated with an application software that may be used for a current application. Further, the database server 104 may be configured to store a plurality of ASTs. Further, the database server 104 may store one or more sets of instructions, code, programs, or algorithms that are required for automatic configuration management of the application software. For example, the one or more sets of instructions, code, scripts, or programs may be retrieved by the application server 106 to perform one or more operations, such as distance computation, variable extraction, or feature extraction based on the plurality of ASTs. For querying the database server 104, one or more querying languages, such as, but not limited to, Structured Query Language (SQL), QUEL, and DMX, may be utilized. In an embodiment, the database server 104 may be realized through various technologies, such as, but not limited to, Microsoft® SQL Server, Oracle®, IBM DB2®, Microsoft Access®, PostgreSQL®, MySQL®, and SQLite®.

The application server 106 refers to a computing device or a software framework hosting an application or a software service that may be communicatively coupled to the communication network 108. In an embodiment, the application server 106 may be implemented to execute procedures, such as, but not limited to, programs, routines, or scripts stored in one or more memory units for supporting the hosted application or the software service. In an embodiment, the hosted application or the software service may be configured to perform the one or more operations of the application server 106.

The application server 106 may receive a request for the automatic configuration management of the application software for the application, from the user-computing device 102. The application server 106 may transmit a query to the database server 104 to extract the plurality of previous configuration values corresponding to the plurality of configuration parameters, based on the received request. Based on the extracted plurality of previous configuration values, the application server 106 may be configured to perform parsing on the extracted plurality of previous configuration values. Further, the application server 106 may be configured to generate the plurality of ASTs based on the parsing of the extracted plurality of previous configuration values. The application server 106 may be further configured to perform one or more pre-specified operations on the generated plurality of ASTs. The one or more pre-specified operations may be selected based on at least the one or more user preferences and the extracted plurality of previous configuration values. The one or more pre-specified operations on the generated plurality of ASTs may correspond to a distance computation operation, a variable extraction operation, and a feature extraction operation.

In another embodiment, the application server 106 may be configured to determine a navigation pattern. The navigation pattern may be determined using the one or more pre-specified operations, based on at least the one or more user preferences and the extracted plurality of previous configuration values. The application server 106 may be configured to generate a short name of the current configuration value. Further, the application server 106 may be configured to determine a set of configuration values of the current configuration parameter based on the navigation pattern. Based on the determined set of configuration values of the current configuration parameter, the application server 106 may be configured to control the configuration of the application software at the user-computing device 102. The various operations and functionalities of the application server 106 have been described in detail, for example, in conjunction with FIG. 2 and FIG. 3.

The application server 106 may be realized through various types of application servers, such as, but not limited to, a Java application server, a .NET framework application server, a Base4 application server, a PHP framework application server, or any other application server framework. An embodiment of the structure of the application server 106 has been described in conjunction with FIG. 2.

A person having ordinary skill in the art will appreciate that the scope of the disclosure is not limited to realizing the application server 106 and the user-computing device 102 as separate entities. In an embodiment, the application server 106 may be realized as an application program installed and/or running on the user-computing device 102, without departing from the scope of the disclosure.

A person having ordinary skill in the art will appreciate that the scope of the disclosure is not limited to realizing the database server 104 and the application server 106 as separate entities. In an embodiment, the one or more functionalities of the database server 104 may be integrated into the application server 106 or vice-versa, without departing from the scope of the disclosure.

The communication network 108 may include a medium through which one or more devices, such as the user-computing device 102, and one or more servers, such as the database server 104 and the application server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11 and 802.16, cellular communication protocols, such as Long Term Evolution (LTE) and Light Fidelity (Li-Fi), and/or other cellular communication protocols or Bluetooth (BT) communication protocols.

Figure 2:
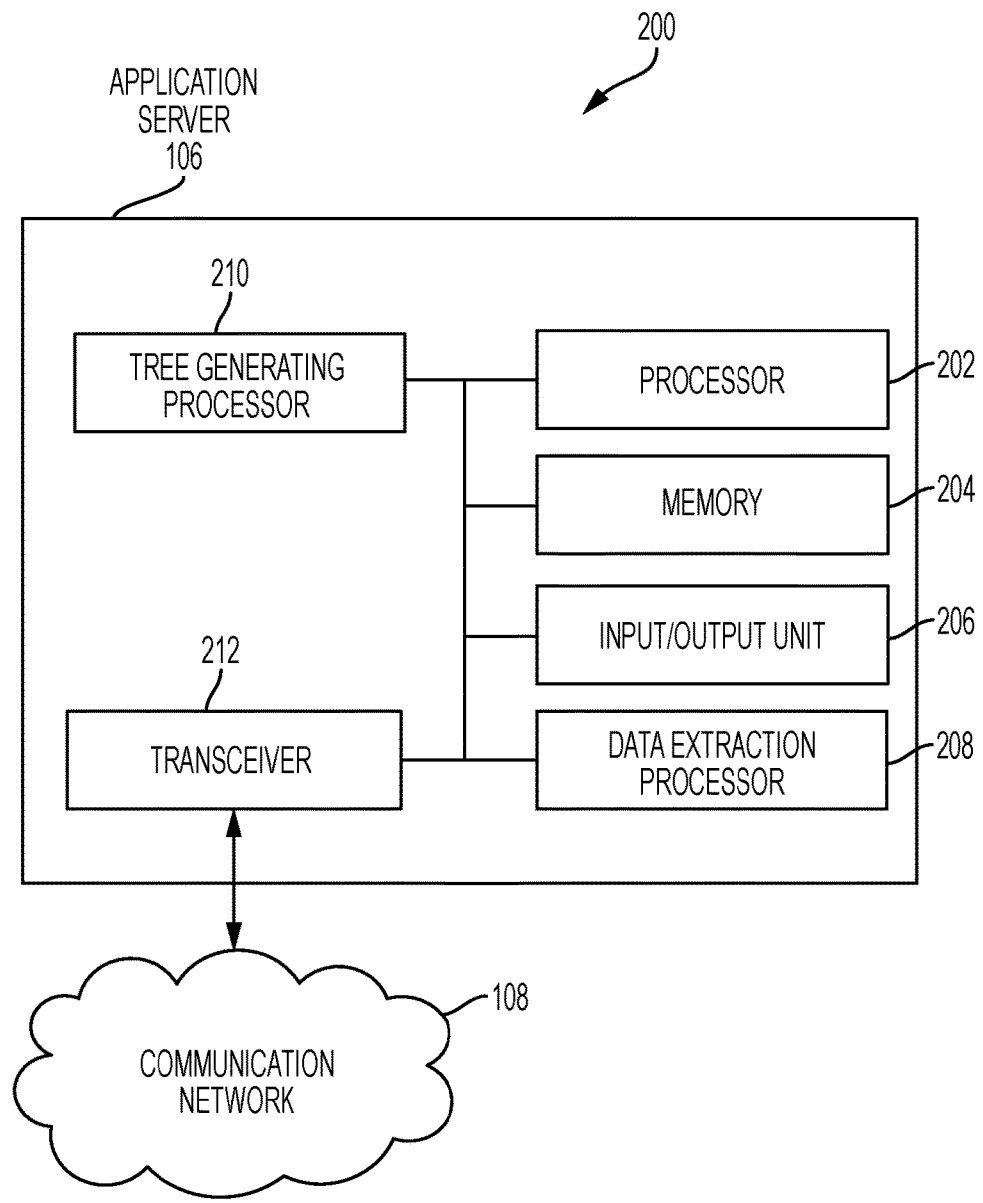
FIG. 2 is a block diagram that illustrates a composite navigational system for the automatic configuration management of application software, in accordance with at least one embodiment.

FIG. 2 is a block diagram that illustrates a composite navigational system for the automatic configuration management of application software, in accordance with at least one embodiment. With reference to FIG. 2, there is shown a system 200 that may include one or more circuits. For example, the system 200 may include one or more processors, such as a processor 202, one or more memory units, such as a memory 204, one or more input/output (I/O) units, such as an I/O unit 206, one or more data extraction processors, such as a data extraction processor 208, one or more tree generating processors, such as a tree generating processor 210, and one or more transceivers, such as a transceiver 212. With reference to FIG. 2, there is further shown the communication network 108 (FIG. 1).

The system 200 may correspond to a computing device, such as the user-computing device 102, or a computing server, such as the application server 106, without departing from the scope of the disclosure. However, for the purpose of the ongoing description, the system 200 corresponds to the application server 106.

The processor 202 may comprise suitable logic, circuitry, interfaces, and/or code that may be configured to execute the one or more sets of codes, instructions, programs, or algorithms stored in the memory 204 to perform the one or more operations. For example, the processor 202 may be configured to determine the set of configuration values of the current configuration parameter. The processor 202 may be further configured to determine one or more tree distances among one or more pairs of ASTs in the plurality of ASTs generated by the tree generating processor 210. Further, the processor 202 may be configured to cluster one or more values in the data structure. In an embodiment, the processor 202 may be configured to filter a list of values from a set of values based on filtering criteria. In an embodiment, the processor 202 may be configured to predict the set of configuration values of the current configuration parameter. In an embodiment, the processor 202 may be configured to generate the short name of the current configuration value. Further, in an embodiment, the processor 202 may be configured to control the configuration of the application software for executing the application at the user-computing device 102.

The processor 202 may be communicatively coupled to the memory 204, the I/O unit 206, the data extraction processor 208, the tree generating processor 210, and the transceiver 212. The processor 202 may be further communicatively coupled to the communication network 108. The processor 202 may work in coordination with the memory 204, the I/O unit 206, the data extraction processor 208, the tree generating processor 210, and the transceiver 212 for the automatic configuration management of the application software. The processor 202 may be implemented based on a number of processor technologies. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processors or control circuits.

The memory 204 may comprise suitable logic, circuitry, interfaces, and/or code that may be configured to store one or more machine code and/or computer programs having at least one code section executable by the processor 202, the I/O unit 206, the data extraction processor 208, the tree generating processor 210, and the transceiver 212. The memory 204 may store the one or more sets of instructions, programs, codes, or algorithms that are executed by the processor 202, the I/O unit 206, the data extraction processor 208, the tree generating processor 210, and the transceiver 212. In an embodiment, the memory 204 may store the plurality of previous configuration values corresponding to the plurality of configuration parameters. Further, the memory 204 may store the generated plurality of ASTs. Further, the memory 204 may store the one or more sets of instructions, codes, programs, or algorithms that are required to execute the navigation pattern. Some of the commonly known memory implementations may include, but are not limited to, a random access memory (RAM), a read only memory (ROM), a hard disk drive (HDD), and a secure digital (SD) card. It will be apparent to a person having ordinary skill in the art that the one or more instructions stored in the memory 204 enable the hardware of the system 200 to perform the one or more operations.

The I/O unit 206 may comprise suitable logic, circuitry, interfaces, and/or code that may be operable to facilitate the individual, such as the user, to provide one or more requests and associated pre-requisite information. For example, the user may utilize the I/O unit 206 to provide one or more preferences for the automatic configuration management of the application software for executing the application at user-computing device 102. The I/O unit 206 may be operable to communicate with the processor 202, the memory 204, the data extraction processor 208, the tree generating processor 210, and the transceiver 212. Examples of the input devices include, but are not limited to, a keyboard, a mouse, a joystick, a touch screen, a microphone, a camera, and/or a docking station. Examples of the output devices include, but are not limited to, a display screen and/or a speaker.

The data extraction processor 208 may comprise suitable logic, circuitry, interfaces, and/or code that may be configured to execute the one or more sets of instructions, programs, codes, or algorithms stored in the memory 204 to perform the one or more operations. For example, the data extraction processor 208 may be configured to extract the plurality of previous configuration values corresponding to the plurality of configuration parameters from the database server 104. In an embodiment, the data extraction processor 208 may be configured to extract a plurality of variables from the generated plurality of ASTs. In an embodiment, the data extraction processor 208 may be configured to extract a plurality of features from the generated plurality of ASTs. The data extraction processor 208 may be communicatively coupled to the processor 202, the memory 204, the I/O unit 206, the tree generating processor 210, and the transceiver 212. The data extraction processor 208 may be implemented based on a number of processor technologies. For example, the data extraction processor 208 may be implemented using one or more of, but not limited to, an X86-based processor, a RISC processor, an ASIC processor, a CISC processor, and/or other processors or control circuits.

The tree generating processor 210 may comprise suitable logic, circuitry, interfaces, and/or codes that may be configured to execute the one or more sets of instructions, programs, codes, or algorithms stored in the memory 204 to perform the one or more operations. For example, the tree generating processor 210 may be configured to generate the plurality of ASTs. The tree generating processor 210 may be communicatively coupled to the processor 202, the memory 204, the I/O unit 206, the data extraction processor 208, and the transceiver 212. The tree generating processor 210 may be implemented based on a number of processor technologies. For example, the tree generating processor 210 may be implemented using one or more of, but not limited to, an X86-based processor, a RISC processor, an ASIC processor, a CISC processor, and/or other processors or control circuits.

The transceiver 212 may comprise suitable logic, circuitry, interfaces, and/or codes that may be configured to receive/transmit the one or more queries/requests, the one or more user preferences, and/or other information from/to one or more computing devices or servers (e.g., the user-computing device 102, the database server 104, and/or the application server 106) over the communication network 108. The transceiver 212 may use one or more known technologies to support wired or wireless communication with the communication network 108. In an embodiment, the transceiver 212 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN), and/or a metropolitan area network (MAN). The wireless communication may use any of a plurality of communication standards, protocols, and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
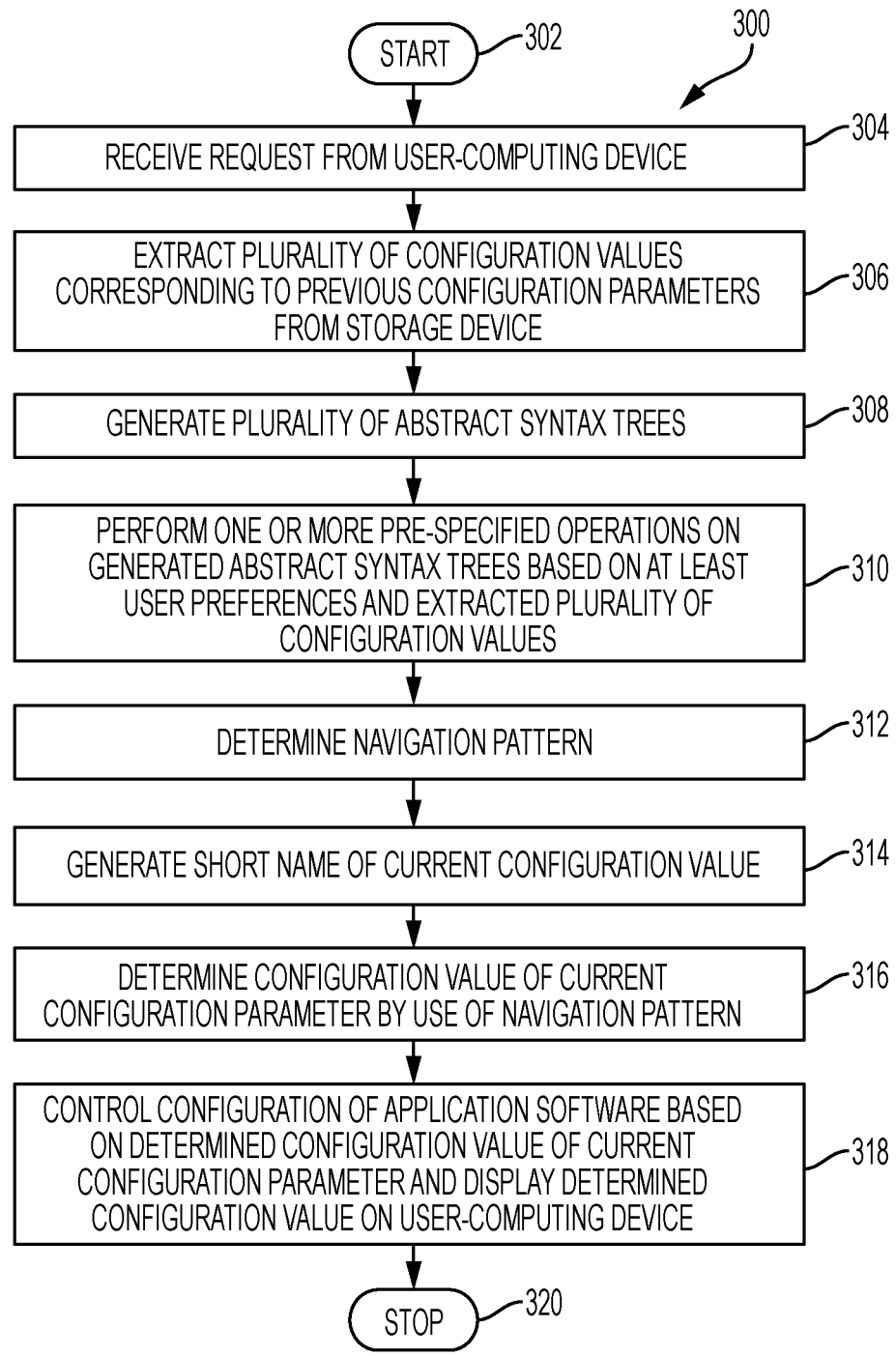
FIG. 3 is a flowchart that illustrates a composite navigational method for the automatic configuration management of application software, in accordance with at least one embodiment.

The various functions and/or operations performed by the one or more circuits in the application server 106, for example, the processor 202, the data extraction processor 208, and the tree generating processor 210, are further described in detail in conjunction with FIG. 3.

FIG. 3 is a flowchart that illustrates a composite navigation method for the automatic configuration management of application software, in accordance with at least one embodiment. With reference to FIG. 3, there is shown a flowchart 300 that is described in conjunction with FIG. 1 and FIG. 2. The method starts at step 302 and proceeds to step 304.

At step 304, the request is received from the user-computing device 102. The request may correspond to a configuration request. In an embodiment, the processor 202, in conjunction with the transceiver 212, may be configured to receive the configuration request from the user-computing device 102 over the communication network 108. The received configuration request may comprise the request for the automatic configuration of the application software based on which the application may be executed at the user-computing device 102. For example, a user, by use of one or more input devices of the user-computing device 102, may input the configuration request that may correspond to the automatic configuration management of pension plan application software. The user-computing device 102 may transmit the configuration request to the application server 106, via the communication network 108.

In an embodiment, the configuration request may further comprise one or more variables. The one or more variables may be defined by the user using the user-computing device 102. For example, the user may define variables, such as "age" of the user or "number of years of service" of the user, for a configuration parameter. A person having ordinary skill in the art will understand that the example of the pension plan application software is for illustrative purpose and should not be construed to limit the scope of the disclosure.

At step 306, the plurality of previous configuration values corresponding to the plurality of configuration parameters is extracted. In an embodiment, the data extraction processor 208 may be configured to extract the plurality of previous configuration values corresponding to the plurality of system configuration parameters from a storage device, such as the database server 104 or the memory 204. In an embodiment, a previous configuration value may correspond to a logic fragment that represents a previous setting of configuration parameters of the application software that may have been used for a previous application.

The plurality of previous configuration values may be associated with the one or more previous system configurations, represented by $S^1 \ldots S^M$, wherein "M" may correspond to a number. Further, the plurality of system configuration parameters may be represented by $X_1 \ldots X_N$, and the corresponding configuration values may be represented by $V_i$, wherein i may be any number.

At step 308, the plurality of ASTs is generated based on the parsing of the extracted plurality of previous configuration values. In an embodiment, the tree generating processor 210 may be configured to generate the plurality of ASTs based on the parsing of the extracted plurality of previous configuration values. In an exemplary embodiment, the generated AST may include one or more nodes, such as a PL/SQL block node, a body, if expression, then, else, else if and alike, obtained by parsing a configuration value expressed as a fragment of PL/SQL code. Further, the one or more nodes may include a parent node and one or more child nodes associated with the parent node in the parsed AST. A parent node may correspond to a node that may comprise one or more child nodes. A child node may correspond to a node directly connected to the parent node. The relation between the one or more nodes may include a direct relation (e.g., no node between two nodes) or an indirect relation (e.g., at least one node between two nodes).

Prior to the generation of the plurality of ASTs, the processor 202 may perform parsing on the extracted plurality of previous configuration values. The parsing may correspond to a process of analyzing a string of symbols, either in natural languages or computer languages. For example, the extracted plurality of previous configuration values may be parsed into its constituents, resulting in a plurality of parse trees or ASTs.

In an embodiment, the processor 202 may parse the extracted plurality of previous configuration values of the plurality of system configuration parameters by use of a language specific parser. The language-specific parser may be generated using one or more parser generator tools, such as an ANTLR tool. In an exemplary scenario, a PL/SQL parser generated using the ANTLR tool may be utilized to parse PL/SQL code fragments corresponding to the plurality of previous configuration values of the plurality of system configuration parameters.

At step 310, the one or more pre-specified operations are performed on the generated plurality of ASTs based on at least the one or more user preferences. The one or more pre-specified operations on the generated ASTs may correspond to the distance computation operation, the variable extraction operation, and the feature extraction operation.

In an embodiment, the processor 202 may perform the distance computation operation by use of a tree edit distance measure. More specifically, the processor 202 may be configured to compute the one or more tree distances among the one or more pairs of ASTs in the generated plurality of ASTs, by use of the tree edit distance measure. The processor 202 may generate a data structure, such as a matrix of tree distances, based on computed distances between all pairs of ASTs corresponding to available values of a given configuration parameter. The distance between two ASTs may be computed by use of a symmetric tree edit distance measure. The tree edit distance measure may be defined as a smallest number of modifications that may be required to convert one AST into another AST. The modifications may occur due to insertion of a tree node, deletion of a tree node, or substitution of one tree node with another.

In an embodiment, the processor 202 may perform the variable extraction operation to extract the plurality of variables from the generated plurality of ASTs based on the user request received from the user-computing device 102. In an embodiment, the processor 202 may be configured to extract the plurality of variables, which are unique with respect to each other, from the generated plurality of ASTs based on the identification of the one or more nodes marked with the variables, in the generated plurality of ASTs during traversal of the generated plurality of ASTs. The one or more nodes may be marked as the variables based on a stored pre-defined language's grammar specification in the database server 104.

In an embodiment, the processor 202 may perform the feature extraction operation to extract the plurality of features from the generated plurality of ASTs. Some examples of features include frequency histograms of different types of tree nodes, and the depth and width of the tree.

At step 312, the navigation pattern is determined. In an embodiment, the processor 202 may be configured to determine the navigation pattern. In an embodiment, the navigation pattern may be determined using the one or more pre-specified operations, based on at least the one or more user preferences and the extracted plurality of previous configuration values. In an embodiment, the navigation pattern may be generated based on the received request for one or more specific applications, a specific current configuration parameter (e.g., $X_i$), the size of the set of previous configuration values $V_i$, required accuracy of the prediction, or quality of clustering.

In an embodiment, the processor 202 may determine a navigation pattern based on the sequence of the one or more pre-specified operations, such as the distance computation operation, the variable extraction operation, and the feature extraction operation. Each operation in the sequence of the one or more pre-specified operations may be associated with additional operations. For example, the distance computation operation is associated with a data structure determination operation and a clustering operation. Similarly, the variable extraction operation is associated with a de-duplication operation and a filtering operation. Similarly, the feature extraction operation is associated with a training operation and a prediction operation.

Based on the sequence of the one or more pre-specified operations and associated additional operations, the processor 202 may be configured to determine the navigation pattern. For example, in accordance with a navigational pattern, the processor 202 attempts to predict the configuration value of the current configuration parameter based on at least the extracted plurality of features from the previous configuration values for the current configuration parameter, the configuration values of other configuration parameters, and one or more trained classifiers. In case the processor 202 determines that a confidence score associated with the prediction is less than a threshold value, the processor 202 may cluster the one or more values in the determined data structure to enable the hierarchical navigation of the extracted previous configuration values. Thereafter, the processor 202 may filter the list of values from the set of values based on filtering criteria, which is defined by the user in the request using the user-computing device 102. One such navigation pattern has been described in detail in FIG. 4B.

Another sequence of the one or more pre-specified operations may include the filtering operation followed by the prediction operation and the clustering operation. In case the count of predicted values (for example, n-best) exceeds a threshold value, the clustering operation may be performed to browse the predicted values hierarchically. In another case, when the initial number of values is large, the clustering operation may be applied prior to the prediction operation so that predictive models always learn to predict a cluster of similar values.

For brevity, only one navigation pattern comprising the sequence of pre-specified operations has been discussed, as detailed above. Notwithstanding, the determination of the navigation pattern by the processor 202 is not only limited to the aforesaid sequence of pre-specified operations. The processor 202 may determine other navigation patterns comprising different sequences of pre-specified operations, without departing from the scope of the disclosure.

At step 314, the short name of a current configuration value is generated. In an embodiment, the data generation processor 208 may be configured to generate the short name of the current configuration value. Further, the generation of the short name may be based on at least a frequency of occurrence of the plurality of variables in the AST corresponding to a current configuration value.

In an exemplary embodiment, the configuration value may be parsed to generate an AST. Further, the processor 202 may traverse the generated AST to extract the plurality of variables. Further, the extracted plurality of variables may be sorted based on at least the frequency of the occurrence of the plurality of variables in the generated AST. Thereafter, the processor 202 may generate the short name using the most occurring variables from the sorted plurality of variables.

In an embodiment, the user may edit or replace the generated short name by use of a dictionary stored in the database server 104. Further, the dictionary relates the plurality of extracted variables to one or more English words or one or more phrases appropriate to the context of the specific configuration parameter. For example, the variable "age" may correspond to an "early retirement age" in an instance and it may correspond to a "normal retirement age" in other instance.

At step 316, the configuration value of the current configuration parameter is determined based on the navigation pattern. In an embodiment, the processor 202 may be configured to determine the configuration value of the current configuration parameter by use of the navigation pattern. The navigation pattern may correspond to the hierarchical navigation or the variable-based filtering navigation. For example, the hierarchical navigation of logic fragments in a set of potential values for a given configuration parameter may be realized or executed using unsupervised machine learning methods. The variable-based filtering navigation of the logic fragments in the set of potential values may be realized or executed based on key variables extracted from the logic fragments.

At step 318, configuration of the application software instance is controlled at the user-computing device 102 over the communication network 108 based on the determined configuration value of the current configuration parameter. In an embodiment, the processor 202 may be configured to control the configuration of the application software at the user-computing device 102 over the communication network 108 based on the determined configuration value of the current configuration parameter. Further, the processor 202 may render the determined configuration value at the GUI on the display screen of the user-computing device 102. The control passes to end step 320.

Figure 4A:
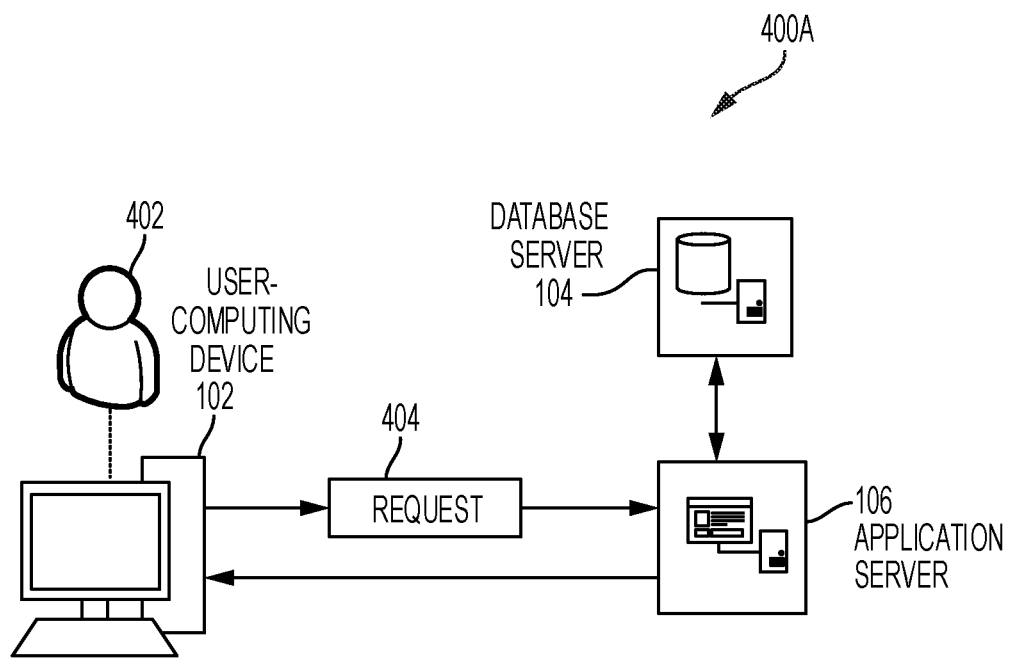
FIGS. 4A and 4B, collectively, illustrate an exemplary workflow diagram of a composite navigational method for the automatic configuration management of application software, in accordance with at least one embodiment.
Figure 4B:
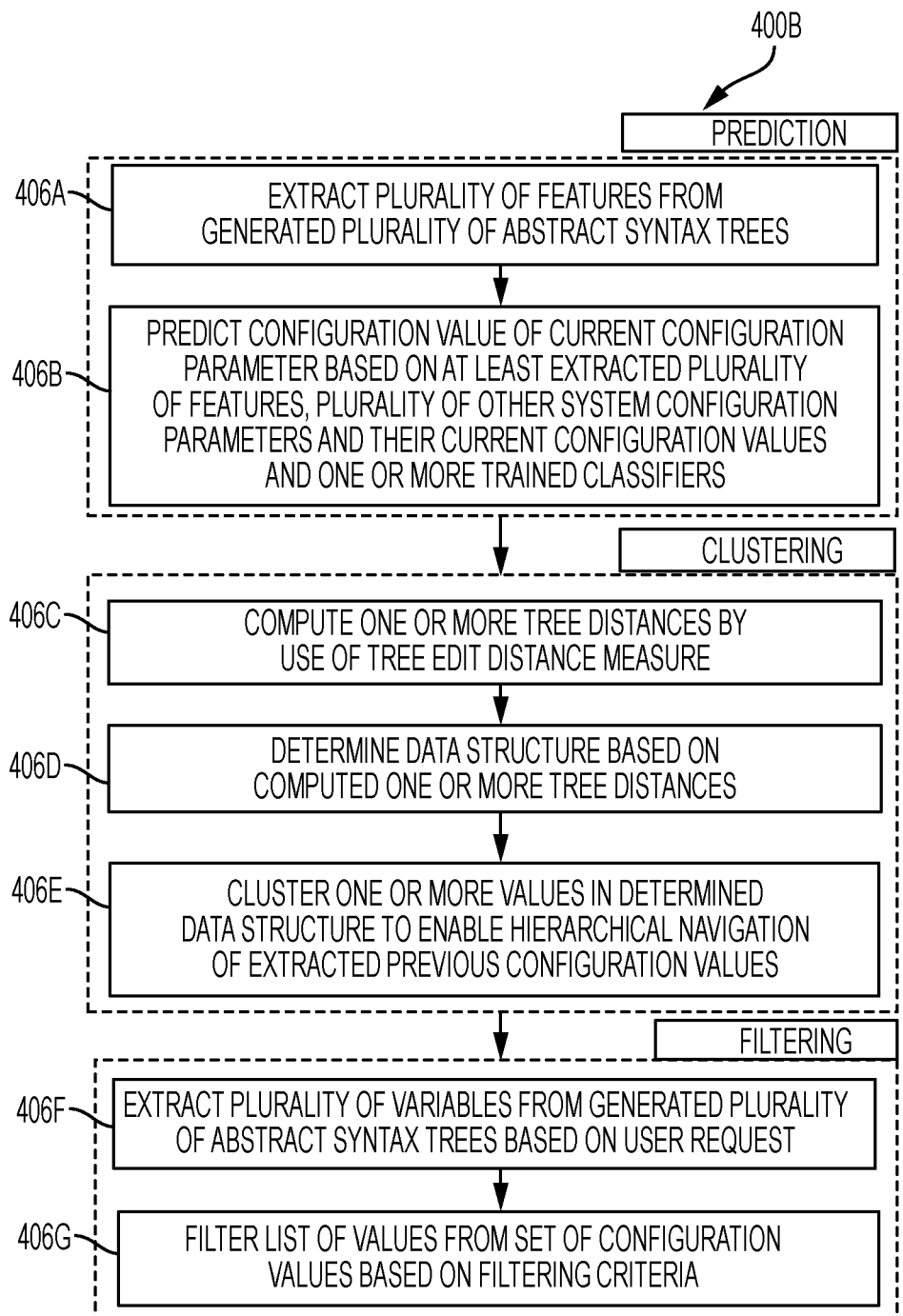

FIGS. 4A and 4B, collectively, illustrate an exemplary workflow diagram for a composite navigational method for the automatic configuration management of application software, in accordance with at least one embodiment. With reference to FIG. 4A, there is shown an exemplary workflow diagram 400A that has been described in conjunction with FIG. 1, FIG. 2, FIG. 3, and FIG. 4B.

With reference to FIG. 4A, there is shown the user-computing device 102 (FIG. 1) that may be utilized by the user (denoted by 402) to provide the request (denoted by 404) to configure the application software to execute the application on the user-computing device 102. There is further shown the database server 104 and the application server 106 (FIG. 1). The application server 106 may be configured to perform the automatic configuration management of the application software at the user-computing device 102, in accordance with flowcharts 300 and 400B. The application server 106 may be configured to perform steps similar to the steps 302 to 310 of the flowchart 300, as illustrated in FIG. 3. At step 312, based on at least user preferences and the extracted plurality of previous configuration values, the processor 202 in the application server 106 determines a navigation pattern. The navigation pattern includes a sequence of the one or more pre-specified operations and associated additional operations, as illustrated in the flowchart 400B.

With reference to the flowchart 400B, at step 406A, the plurality of features is extracted from the generated plurality of ASTs. In an embodiment, the data extraction processor 208 may be configured to extract the plurality of features from the generated plurality of ASTs.

At step 406B, the configuration value of the current configuration parameter is predicted based on at least the extracted plurality of features, the plurality of other system configuration parameters and their current values, and one or more trained classifiers. The one or more classifiers may be trained in the offline learning phase of the system.

In an embodiment, the processor 202 may predict the configuration value in two phases. The two phases include a training phase and a prediction phase. The training phase may be performed in an offline mode. The one or more classifiers may be trained to make predictions regarding the most likely value $v_i$ of the current configuration parameter $X_i$ given that a subset of configuration parameters have just been configured as $X_1=v_1, X_2=v_2 \ldots X_{i-1}=v_{i-1}$, and given data about previous system configurations $S^1 \ldots S^M$. For example, a set of previous system configurations may be parsed to generate ASTs. Further, the plurality of features may be extracted from the generated ASTs. The generated plurality of features may be further utilized to train the one or more classifiers. The one or more trained classifiers may correspond to a trained predictive model. In an exemplary embodiment, the trained predictive model may be composed of N trained models, each specialized for a different system parameter. Further, different types of predictive models may be used for this purpose. For example, one type of model may be based on Nearest Neighbors. In this model, training involves simply storing the previous system configuration(s) as "exemplars" in a form that may be easy to retrieve efficiently. Other models, such as Logistic Regression, Graphical Models, and Association Rules from the Data Mining and Machine Learning literature, may be further used instead of Nearest Neighbors. Training these models may involve parsing the previous configuration values and computing suitable features that are used for training the one or more classifiers, as discussed above. In an embodiment, if the confidence in the accuracy of prediction is low, then the processor 202 may present the complete list of the previous configuration values $V_i$ in clustered form to enable the user to browse the values hierarchically.

At step 406C, the one or more tree distances are computed by use of a tree edit distance measure. In an embodiment, the processor 202 may be configured to compute the one or more tree distances among the one or more pairs of ASTs in the generated plurality of ASTs, by use of the tree edit distance measure.

For example, the processor 202 may generate a data structure, such as a matrix of tree distances, based on computed distances between all pairs of ASTs corresponding to available values of the current configuration parameter. For example, for a configuration parameter, such as Benefit Computation, there may be "100" distinct values. In such scenario, a "100×100" matrix of tree distances may be generated by the processor 202. The distance between two ASTs may be computed by use of the tree edit distance measure. The tree edit distance measure may be defined as the number of modifications that may be required to convert one AST into another AST. The modifications may occur due to insertion of a tree node, deletion of a tree node, or substitution of one tree node with another.

In an exemplary embodiment, let "T1" be the AST having each node assigned with a symbol from a fixed finite alphabet, to be converted into another AST "T2" based on one or more user inputs provided by the user associated with the user-computing device 102. The one or more user inputs may correspond to one of the insert operation, the delete operation, or the modify operation on the AST "T1." For example, a change in the label of a node "v" in "T1" may correspond to the modify operation. Further, deleting a child node "v" in "T1" with a parent node "V" may correspond to the delete operation. Further, inserting a node "v" as a child of "V" in "T1" may correspond to the insert operation. Thereafter, the processor 202 may compute the one or more tree distances based on the one or more operations, as described above, so as to convert the AST "T1" into another AST "T2."

A person having ordinary skill in the art will understand that the example to compute the one or more tree distances between one or more pairs of ASTs by use of the tree edit distance measure is for illustrative purpose and should not be construed to limit the scope of the disclosure.

At step 406D, the data structure is determined based on the computed one or more tree distances. In an embodiment, the processor 202 may be configured to determine the data structure. In an exemplary embodiment, the processor 202 may determine the data structure based on the computed one or more tree distances between the ASTs "T1" and "T2."

At step 406E, one or more values provided in the determined data structure are used to cluster and thereby enable hierarchical navigation of the extracted previous configuration values. In an embodiment, the processor 202 may be configured to cluster the one or more values provided in the determined data structure to enable the hierarchical navigation of the extracted previous configuration values. In an exemplary embodiment, the processor 202 may utilize an affinity-based clustering to generate a variable number of clusters. The affinity-based clustering may be based on the distance matrix (i.e., the data structure) using a message passing technique. Other clustering methods including k-means and agglomerative hierarchical clustering with different types of linkage and may be used without limiting the scope of the disclosure.

At step 406F, the plurality of variables is extracted from the generated plurality of ASTs based on the user request received from the user-computing device 102. In an embodiment, the processor 202 may be configured to extract the plurality of variables from the generated plurality of ASTs based on the received user request. In an embodiment, the processor 202 may be configured to extract the plurality of variables from the generated plurality of ASTs based on the identification of the one or more nodes marked with the variables, in the generated plurality of ASTs during traversal of the generated plurality of ASTs. The one or more nodes may be marked as the variables based on a stored predefined language's grammar specification in the database server 104.

At step 406G, the list of values is filtered from a set of configuration values based on a filtering criteria. In an embodiment, the processor 202 may be configured to filter the list of values from the set of values based on the filtering criteria. The filtering criteria may be defined by the user in the request using the user-computing device 102.

In an exemplary embodiment, the set of values for the configuration parameter "Benefit Computation" may include values that in turn contain variables corresponding to the "age" of the user, "years of service" of the user, etc. Thereafter, the processor 202 may filter these values based on the user defined filtering criteria. For example, the user may define the filtering criteria as "filter the list of values that refer to the user's age from the set of values." Based on the received filtering criteria, the processor 202 may filter the set of values to obtain the list of values that refer to the user's age.

Control passes back to the step 314 in flowchart 300 of FIG. 3. Similar to the explanation of steps 314 to 318 of the flowchart 300 in FIG. 3, the processor 202 in the application server 106 determines the configuration value of the current configuration parameter based on the navigation pattern and generates a short name of the current configuration value. Further, the processor 202 in the application server 106 controls the configuration of the application software at the user-computing device 102 over the communication network 108 based on the determined configuration value of the current configuration parameter. Furthermore, the processor 202 in the application server 106 renders the determined configuration value at the GUI on the display screen of the user-computing device 102.

Figure 5:
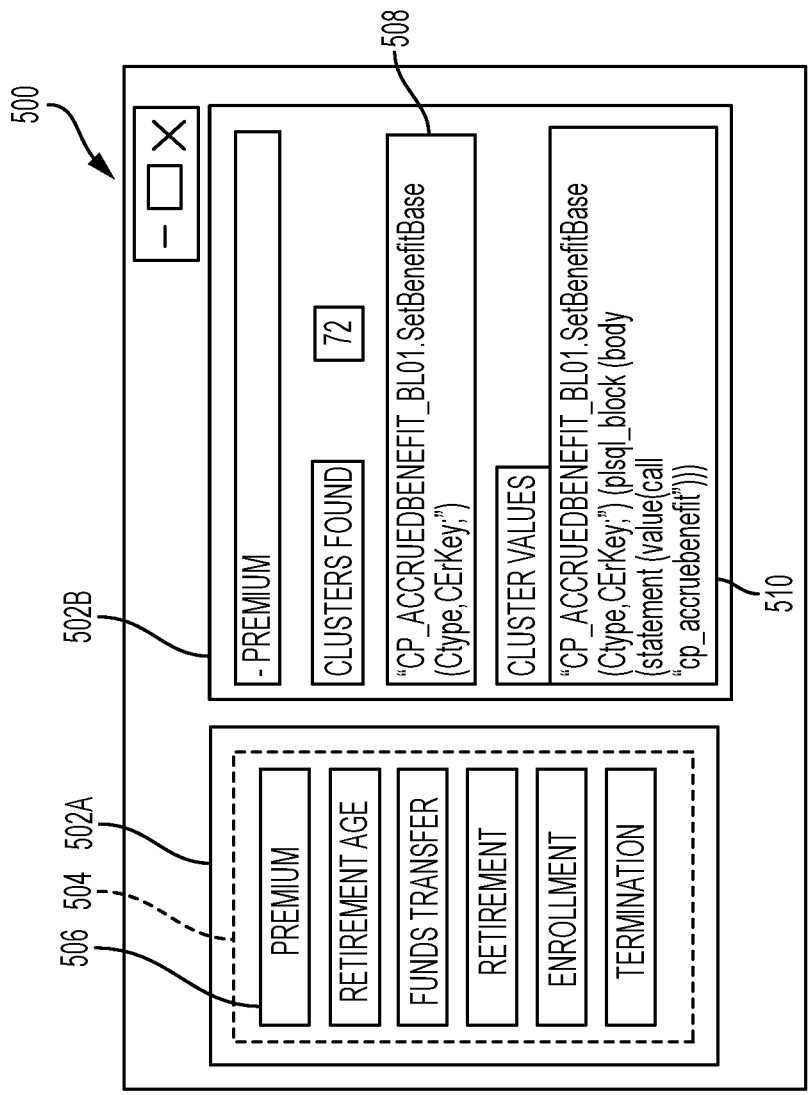
FIG. 5 illustrates an exemplary user interface for hierarchical navigation, in accordance with at least one embodiment.

FIG. 5 illustrates an exemplary user interface for hierarchical navigation, in accordance with at least one embodiment. There is shown an exemplary user interface 500 that is presented on the display screen of the user-computing device 102. The exemplary user interface 500 has been illustrated, in conjunction with FIG. 1 to FIG. 4B.

With reference to user interface 500 in FIG. 5, there is shown a first portion 502A in which the list of system configuration parameters 504 is presented. In the second portion 502B, one or more clusters are presented corresponding to the previous configuration value of a configuration parameter 506. The one or more clusters of values enable the hierarchical navigation of extracted previous configuration values, as described in step 406E of the flowchart 400B in FIG. 4B. In the user interface 500, there is shown a count of "72" clusters, known as cluster heads. The user may select a cluster head 508 of the one or more clusters for which defined members (denoted by 510) are displayed in the second portion 502B.

Figure 6:
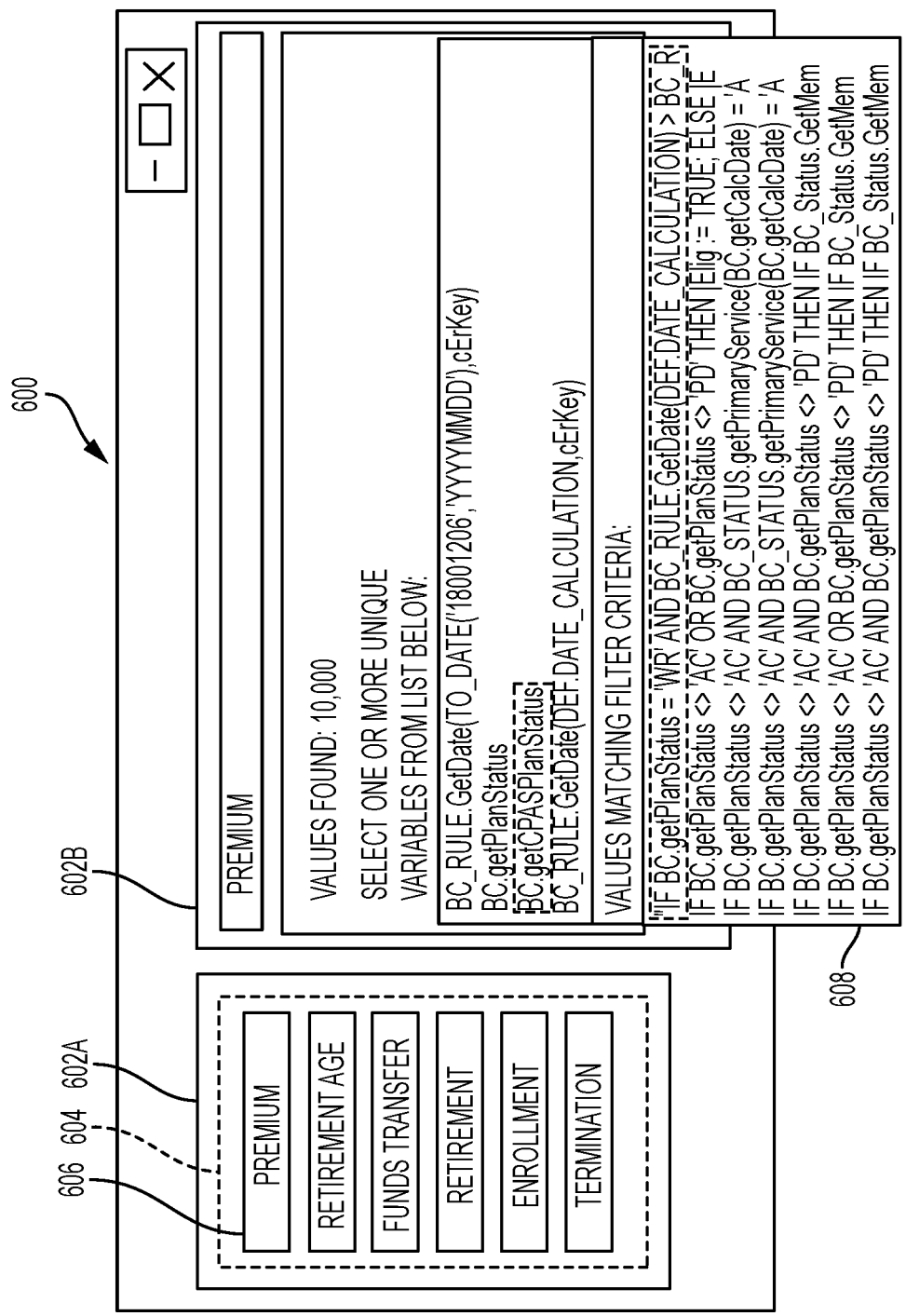
FIG. 6 illustrates an exemplary user interface for variable-based filtering navigation, in accordance with at least one embodiment.

FIG. 6 illustrates an exemplary user interface for variable-based filtering navigation, in accordance with at least one embodiment. There is shown an exemplary user interface 600 that is presented on the display screen of the user-computing device 102. The exemplary user interface 600 has been illustrated, in conjunction with FIG. 1 to FIG. 4B.

With reference to user interface 600 in FIG. 6, there is shown a first portion 602A in which the list of system configuration parameters 604 is presented. In a second portion 602B, a list of extracted variables is presented corresponding to the previous configuration value of a configuration parameter 606. In the second portion 602B, a list of extracted variables 608 is presented to allow a user to select one or more variables from the list of extracted variables for filtering.

The disclosed embodiments encompass numerous advantages. The disclosure provides a composite navigational method and system for the automatic configuration management of application software. The composite navigational method may facilitate the navigation of the re-usable complex configuration values for a configuration parameter. The composite navigational method may re-use the configuration values of the configuration settings from the previous system configurations for the configuration management of a new instantiation of the application software. The composite navigational system may be utilized in application software instantiations in multiple fields, such as finance, insurance, healthcare, and inventory management in stores, production plants, and the like. The composite navigational method may be utilized to optimize the cost associated with the development of the new application software instance by eliminating extra cost due to involvement of an expert programmer. Further, any delay in the development and delivery of products or services may be avoided. Further, any risk of data loss in translation between domain experts and the expert programmer may be reduced.

The disclosed method and system, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive, such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks, such as LAN, MAN, WAN, and the internet. The computer system facilitates input from a user through input devices accessible to the system through the I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The system and method described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above method and system, or the numerous possible variations thereof.

Various embodiments of the composite navigational method and system for automatic configuration management of the application software. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person having ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A composite navigational method for configuration management of application software by a computing server, said method comprising:
   receiving a request, from a user-computing device, for automatic configuration of said application software;
   extracting, by a data extraction processor at said computing server, a plurality of previous configuration values corresponding to a plurality of configuration parameters from a storage device, wherein a previous configuration value in said plurality of extracted previous configuration values corresponds to a logic fragment of said application software at said user-computing device communicatively coupled to said computing server over a communication network;
   generating, by a tree generating processor at said computing server, a plurality of abstract syntax trees (ASTs) based on parsing of said plurality of previous configuration values;
   performing, by a processor at said computing server, one or more pre-specified operations on said generated plurality of ASTs;
   determining, by said processor, a configuration value of a current configuration parameter based on a navigation pattern, wherein said navigation pattern is determined using said performed one or more pre-specified operations based on at least user preferences and said extracted plurality of previous configuration values; and
   controlling, by said processor, configuration of said application software at said user-computing device over said communication network, based on said determined configuration value of said current configuration parameter.

2. The composite navigational method of claim 1, wherein said one or more pre-specified operations corresponds to a distance computation, a variable extraction, or a feature extraction.

3. The composite navigational method of claim 2, wherein said distance computation comprises determining, by said processor at said computing server, a data structure based on a computation of one or more tree distances among one or more pairs of ASTs in said generated plurality of ASTs.

4. The composite navigational method of claim 3 further comprising clustering of one or more values in said determined data structure to enable hierarchical navigation of said extracted previous configuration values.

5. The composite navigational method of claim 2, wherein said variable extraction comprises extracting, by said data extraction processor at said computing server, a plurality of variables from said generated plurality of ASTs based on identification of one or more nodes, marked as a variable in said generated plurality of ASTs during traversal of said generated plurality of ASTs.

6. The composite navigational method of claim 5 further comprising filtering, by said processor at said computing server, a list of values from a set of values based on a filtering criteria.

7. The composite navigational method of claim 2, wherein said feature extraction comprises extracting, by said data extraction processor at said computing server, a plurality of features from said generated plurality of ASTs.

8. The composite navigational method of claim 7 further comprising predicting, by said processor at said computing server, said configuration value of said current configuration parameter based on at least said extracted plurality of features, plurality of configuration parameters, a plurality of previous configuration values corresponding to said plurality of configuration parameters, and one or more classifiers trained on a set of previous system configurations.

9. The composite navigational method of claim 1 further comprising generating, by a data generation processor, a short name of said current configuration value based on at least a frequency of occurrence of a plurality of variables in said generated plurality of ASTs.

10. A composite navigational system for configuration management of application software, said system comprising:
    a transceiver configured to receive a request, from a user-computing device, for automatic configuration of said application software;
    a data extraction processor at a computing server configured to extract a plurality of previous configuration values corresponding to a plurality of configuration parameters from a storage device, wherein a previous configuration value in said plurality of extracted previous configuration values corresponds to a logic fragment of said application software on said user-computing device communicatively coupled to said computing server over a communication network;
    a tree generating processor at said computing server configured to generate a plurality of abstract syntax trees (ASTs) based on parsing of said plurality of previous configuration values;
    a processor at said computing server configured to:
    perform one or more pre-specified operations on said generated plurality of ASTs;
    determine a configuration value of a current configuration parameter based on a navigation pattern, wherein said navigation pattern is determined using said performed one or more pre-specified operations based on at least user preferences and said extracted plurality of previous configuration values; and
    control configuration of said application software based on said determined configuration value of said current configuration parameter.

11. The composite navigational system of claim 10, wherein said one or more pre-specified operations corresponds to a distance computation, a variable extraction, or a feature extraction.

12. The composite navigational system of claim 11, wherein said processor at said computing server is configured to determine a data structure based on a computation of one or more tree distances among one or more pairs of ASTs in said generated plurality of ASTs for said distance computation.

13. The composite navigational system of claim 12 further comprising clustering of one or more values in said determined data structure to enable hierarchical navigation of said extracted previous configuration values.

14. The composite navigational system of claim 11, wherein said data extraction processor at said computing server is configured to extract plurality of variables from said generated plurality of ASTs based on identification of one or more nodes, marked as a variable in said generated plurality of ASTs during traversal of said generated plurality of ASTs for said variable extraction.

15. The composite navigational system of claim 14, wherein said processor at said computing server is further configured to filter a list of values from a set of values based on a filtering criteria.

16. The composite navigational system of claim 11, wherein said data extraction processor at said computing server is configured to extract plurality of features from said generated plurality of ASTs for said feature extraction.

17. The composite navigational system of claim 16, wherein said processor at said computing server is further configured to predict said configuration value of said current configuration parameter based on at least said extracted plurality of features, plurality of configuration parameters, a plurality of previous configuration values corresponding to said plurality of configuration parameters, and one or more classifiers trained on a set of previous system configurations.

18. The composite navigational system of claim 10, wherein a data generation processor is configured to generate a short name of said current configuration value based on at least a frequency of occurrence of a plurality of variables in said generated plurality of ASTs.

19. A computer program product for use with a computer, said computer program product comprising a non-transitory computer readable medium, wherein said non-transitory computer readable medium stores a computer program code for configuration management of application software by a computing server, wherein said computer program code is executable by one or more processors in a computing device to:

receive a request, from a user-computing device, for automatic configuration of said application software;

extract a plurality of previous configuration values corresponding to a plurality of configuration parameters from a storage device, wherein a previous configuration value in said plurality of extracted previous configuration values corresponds to a logic fragment of said application software on said user-computing device communicatively coupled to said computing server over a communication network;

generate a plurality of abstract syntax trees (ASTs) based on parsing of said plurality of previous configuration values;

perform one or more pre-specified operations on said generated plurality of ASTs;

determine a configuration value of a current configuration parameter based on a navigation pattern, wherein said navigation pattern is determined using said performed one or more pre-specified operations based on at least user preferences and said extracted plurality of previous configuration values; and control configuration of said application software based on said determined configuration value of said current configuration parameter.

\* \* \* \* \*